Nov. 30, 1948.  J. R. BAILEY  2,455,154
SHELF ELEVATING MECHANISM FOR FOOD CONTAINERS
Filed July 19, 1946  3 Sheets-Sheet 1

Nov. 30, 1948.  J. R. BAILEY  2,455,154
SHELF ELEVATING MECHANISM FOR FOOD CONTAINERS
Filed July 19, 1946  3 Sheets—Sheet 3
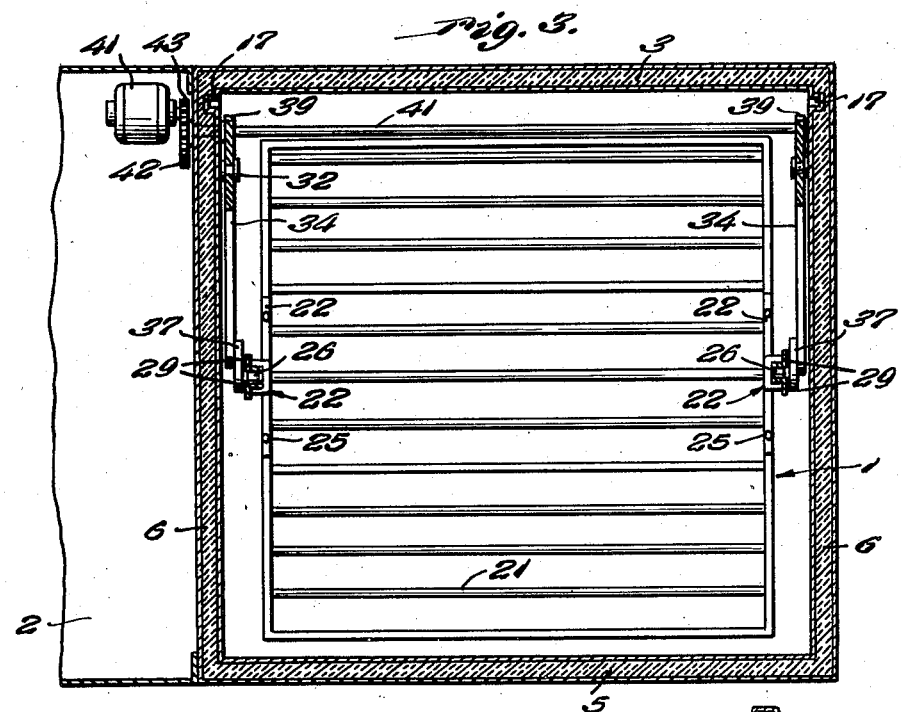
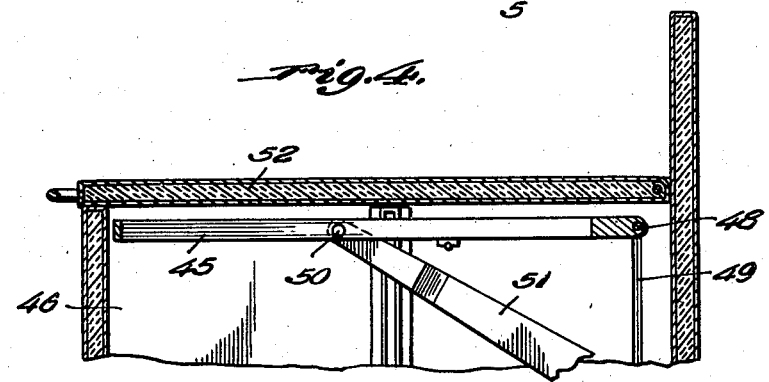
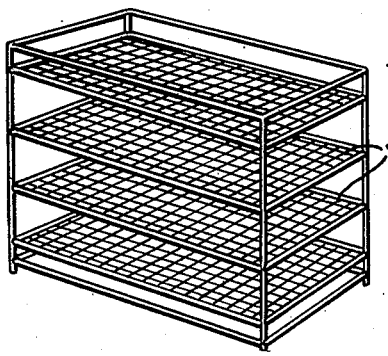
Inventor
James R. Bailey
By Clarence A. O'Brien
and Harvey B. Jacobson
Attorneys Patented Nov. 30, 1948

2,455,154

UNITED STATES PATENT OFFICE 2,455,154

SHELF ELEVATING MECHANISM FOR FOOD CONTAINERS

James R. Bailey, Fort Worth, Tex.

Application July 19, 1946, Serial No. 684,836

1 Claim. (Cl. 312—174)

My invention relates to improvements in shelf elevating mechanism for food containers especially, although not necessarily, stove ovens.

The invention is designed with the primary object in view of providing efficient, simply constructed mechanism for elevating shelves and food containers of the type having a lid, and which is motor operative, primarily, but adapted for optional operation by manual lifting of the lid.

Another object is to provide mechanism of the character and for the purpose set forth which is counterbalanced for operation by a small, low-powered motor, and for easy operation by lifting of the lid.

Still another object is to provide a shelf elevating mechanism adapted for incorporation in drop lid ovens of stoves, and in similar food containers without necessitating extensive alteration in the basic structure of such containers.

Other objects, together with the precise nature of my improvements, will be readily understood when the succeeding description and claim are read with reference to the drawings accompanying and forming part of this specification.

In said drawings:

Figure 3 is a view in horizontal section taken on the line 3—3 of Figure 2.

Figure 4 is a view in transverse vertical section illustrating a modified embodiment of the invention.

Figure 5 is a view in perspective of a food holding structure for use on the shelf in the container.

Figure 1:
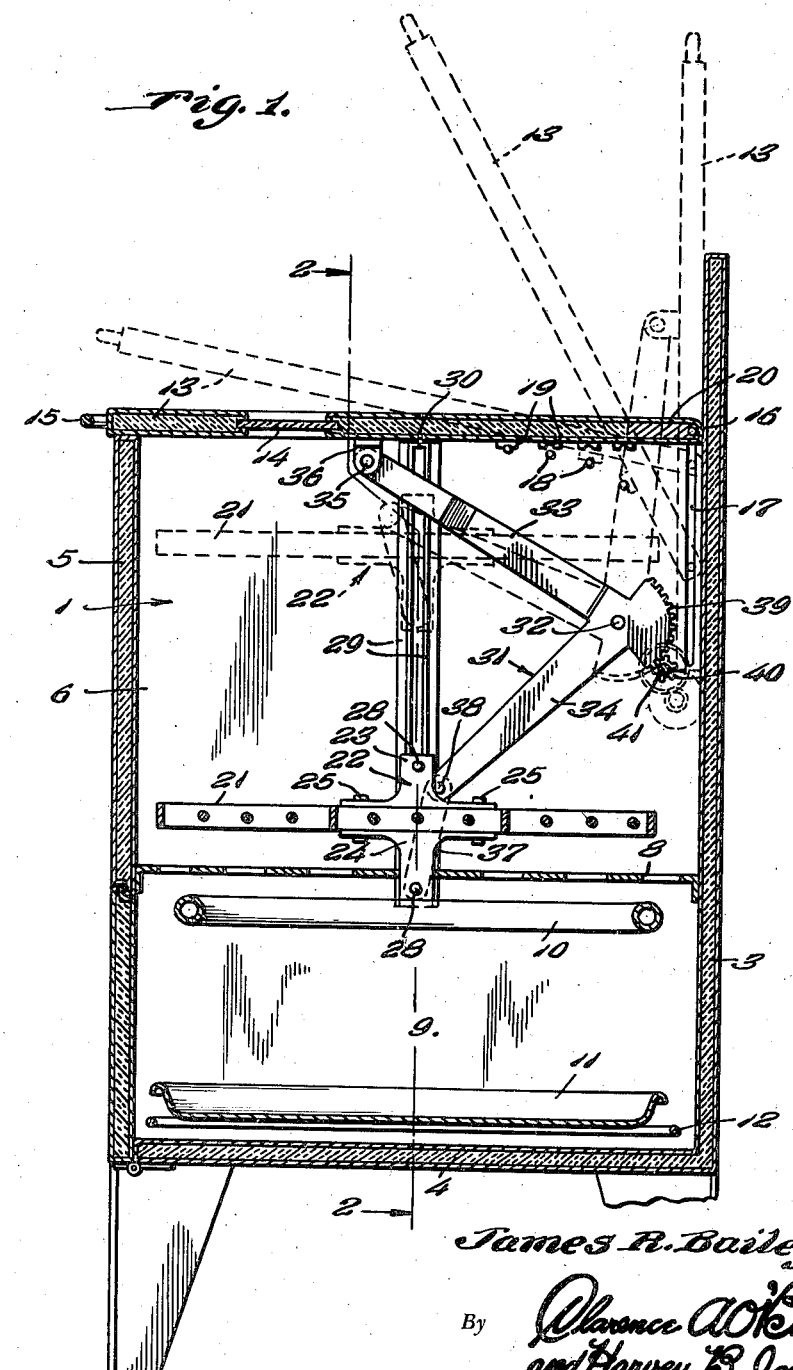
Figure 1 is a view in transverse vertical section taken through a stove oven embodying my invention.
Figure 2:
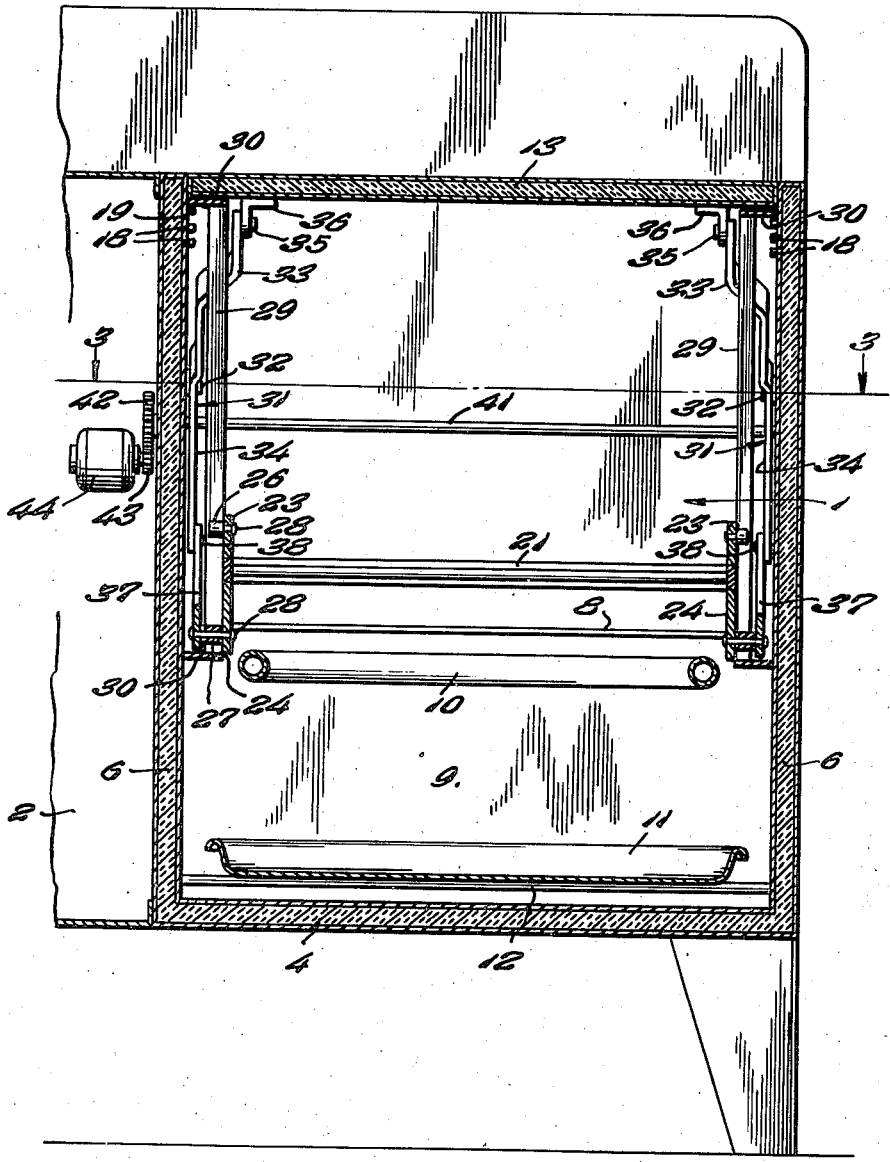
Figure 2 is a view in section taken on the line 2—2 of Figure 1.

Referring to the drawings by numerals, and first to Figures 1 to 3, as exemplifying a preferred practice of my invention, my improved shelf elevating mechanism has been shown as embodied in a food container in the form of an open top oven 1 of a gas stove 2, the oven 1 being formed by insulated back, bottom and front walls 3, 4, and 5, and side walls 6. The usual horizontal, foraminous partition 8 forms the bottom of the oven 1 and together with said walls 3, 4, and 5, a subjacent combustion chamber 9 in the stove 2, and in which is located a gas burner 10 and a drip pan 11 on supports 12.

According to my invention, a flat, insulated lid 13 is provided for the top of the oven 1 and which rests, when closed, on the front wall 5 and fits between the side walls 6 and against the back wall 3. A window 14 is provided in said lid 13 adjacent the front thereof for sighting into the oven 1 when the lid 13 is closed. A suitable handle 15 is provided on the front edge of the lid 13 for opening and closing said lid.

A pivot rod 16 is suitably extended through the rear edge portion of the lid 13 with the ends thereof vertically slidable and rotatable in a pair of vertical guide slots 17 provided in the side walls 6 of the oven 1 contiguous the back wall 3, whereby said lid 13 is swingable upwardly on said pivot rod 16 and slidable downwardly between the side walls 6 into fully opened position established by flat engagement thereof with the back wall 3, as shown in dotted lines in Figure 1.

An arcuate series of lateral studs 18 is provided in the rear of the oven 1 on each side wall 7, and complemental series of lugs 19 on the bottom of the lid 13 adjacent each side thereof, the studs 18 forming stepped-down rests adapted to be engaged by the lugs 19 in different open positions of the lid 13, as shown by dotted lines in Figure 1, said lugs 19 having arcuate bottom faces adapting the same to slidably and rockably engage the studs 18 in the different open positions of the lid 13. The function of the studs 18 and lugs 19 is to lessen friction between the pivot rod 16 and the sides of the slots 17, by providing successive sliding fulcrum points for the lid during opening thereof.

A counterweight 20 in the form of a heavy bar is extended through the lid 13 transversely thereof and directly in front of the pivot rod 16, said counterweight facilitating opening of the lid 13 by counterbalancing the same at the rear thereof to assist downward sliding of said lid.

A grid-type shelf 21 for supporting food (not shown) is provided in the oven 7 and is mounted therein for vertical movement as follows:

The mounting for the shelf 21 comprises a pair of cruciform slides 22 at opposite sides of the shelf, in the transverse center thereof, and formed in upper and lower sections 23, 24, between which said sides of the shelf 21 are interposed with the sections 23, 24 secured to the shelf, as by stove bolts 25. A pair of upper and lower rollers 26, 27 mounted on the sections 23, 24 of each slide 22 by horizontal pins 28 extend in and are confined between pairs of laterally spaced, vertical guide bars 29, of angle iron form, said pairs of bars 29 being provided at opposite sides of the oven 1 and spaced from the side walls 7 with upper and lower ends suitably fixed, by bracket plates 30, to said side walls.

The lid 13 and shelf 21 are connected together for elevating and lowering in unison, as follows: A pair of bell cranks 31 are provided in opposite sides of the oven 1 and are pivotally mounted for vertical rocking movement therein on studs 32 on the side walls 7 located adjacent to the rear wall 3. The bell cranks 31 comprise a pair of upper and lower, relatively long and short arms 33, 34. The long arms 33 are pivotally connected at the ends thereof, as at 35, to angle brackets 36 suitably fixed to the underside of the lid 13. The shorter arms 34 are connected at the ends thereof to the pins 28 of the lower rollers 27 by links 37 pivoted to said shorter arms, as at 38, and swingable on said pins 28.

Power means for operating the bell cranks 31 is provided and now to be described. The bell cranks 31 are provided, on the sides of the studs 32 opposite to the arms 33, 34, with toothed segments 39 meshing with a pair of gear pinions 40 fast on a cross shaft 41 in the rear of the oven 1 having its ends suitably journaled in the side walls 7. A transmission gear 42 fast on one end of the cross shaft 41, outside the oven 1, and alongside one side wall 7, meshes with a smaller drive gear 43 of a motor 44 mounted on the stove 2 in any suitable manner. The motor 44 is designed to be of the reversible type and to be connected, in any usual manner, to a source of energy for control by a reversing starter switch, not shown.

Referring now to the operation of the invention as so far described. The motor 44, when operating in the proper direction, operates the cross shaft 41, through the gears 43, 42 to cause the gear pinions 40, through the toothed segments 39, to swing the bell cranks 31 upwardly and thus swing the lid 13 upwardly so as to open the same in the manner already described. Such operation of the bell cranks 31 simultaneously elevates the shelf 21 from a lowered position in the bottom of the oven 1 into an elevated position in the upper part of said oven 1, so that food deposited upon the shelf 21 is within easy reach and exposed to full view. By then reversing the motor 44, the operations described are effected in reverse and the lid swung downwardly into lowered, closed position so that the shelf 21 is lowered into the bottom of the oven 1. Any suitable controls for the motor 44 may be utilized to stop the same when the lid 13 and shelf 21 are elevated or lowered into a desired position.

As an optional procedure, by manually swinging the lid 13 upwardly, or downwardly, the shelf 21 may be correspondingly elevated or lowered, through the medium of the bell cranks 31 and the links 37, the motor being operated idly through the toothed segments 39, gear pinions 40 and the gears 43, 42.

In the modified embodiment of my invention shown in Figure 4, a frame 45 is provided in the top of the oven 46 for use in lieu of the lid 47 in raising and lowering the shelf. The frame 45 is pivotally mounted by a pivot rod 48, in guide slots 49 in the oven 46 for vertical swinging in the same manner as the lid 13 of the preferred embodiment of the invention, and said frame is operatively connected, as at 50, to the bell cranks, one of which is shown in Figure 4, to operate the same in the same manner as the lid 13 of the preferred embodiment of the invention. Thus, the lid 52 is left free for opening or closing at will without affecting the shelf.

The structure shown in Figure 5 comprises a unit of superposed shelves 53 which may be used on the shelf 21 if desired for any purpose, for instance, to hold different kinds of foods.

The foregoing will, it is believed, suffice to impart a clear understanding of my invention without further explanation.

Manifestly, the invention, as described, is susceptible of modification, without departing from the inventive concept, and right is herein reserved to such modificatitons as fall within the scope of the appended claim.

What I claim is:

A food container having an open top, a lid for said top vertically swingable to raise and lower the same, pairs of vertical guide bars in said container at opposite sides thereof and spaced apart laterally on each pair, a pair of vertically movable slides with rollers thereon interposed between the pairs of guide bars, a shelf in the container having opposite sides mounted on said slides for vertical movement of the shelf by said slides, a pair of bell cranks in said container at opposite sides thereof pivotally mounted for vertical oscillating movement and having one end pivoted to said lid, links connecting the other ends of said bell cranks to said slides and power means for oscillating the bell cranks.

JAMES R. BAILEY.

REFERENCES CITED

The following references are of record in the file of this patent:

UNITED STATES PATENTS

| Number | Name | Date |
|---|---|---|
| 535,203 | Horrocks | Mar. 5, 1895 |
| 1,220,677 | Pattimore | Mar. 27, 1917 |